United States Patent Office 3,044,629
Patented July 17, 1962

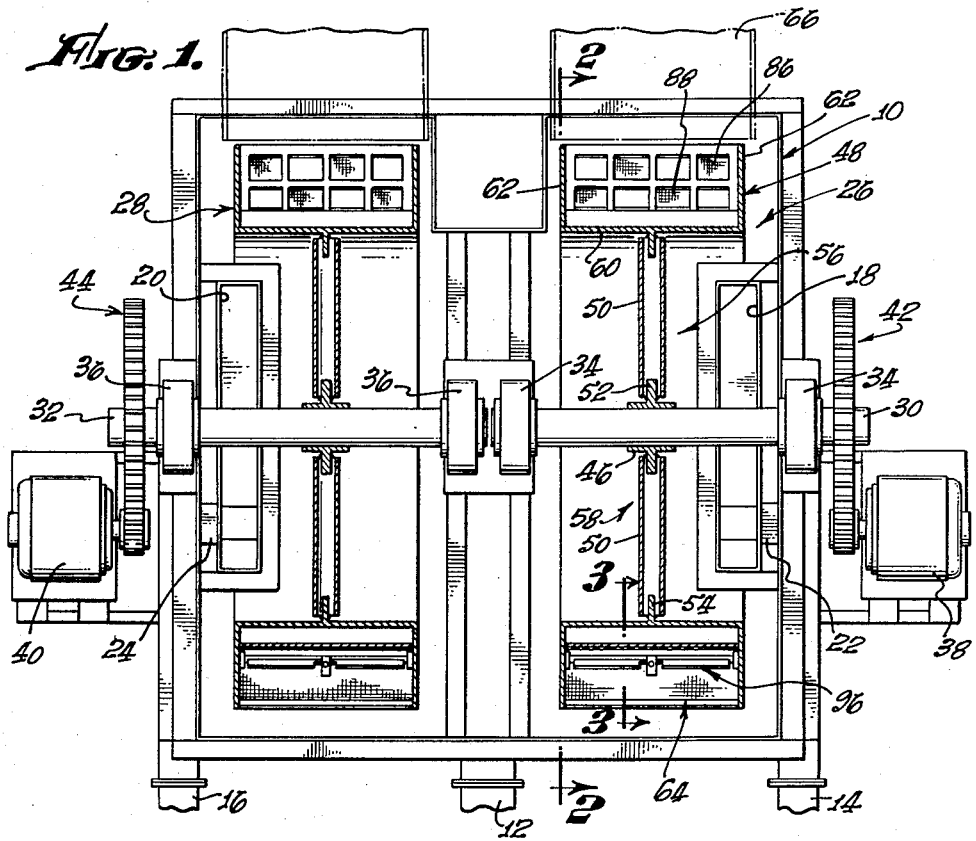
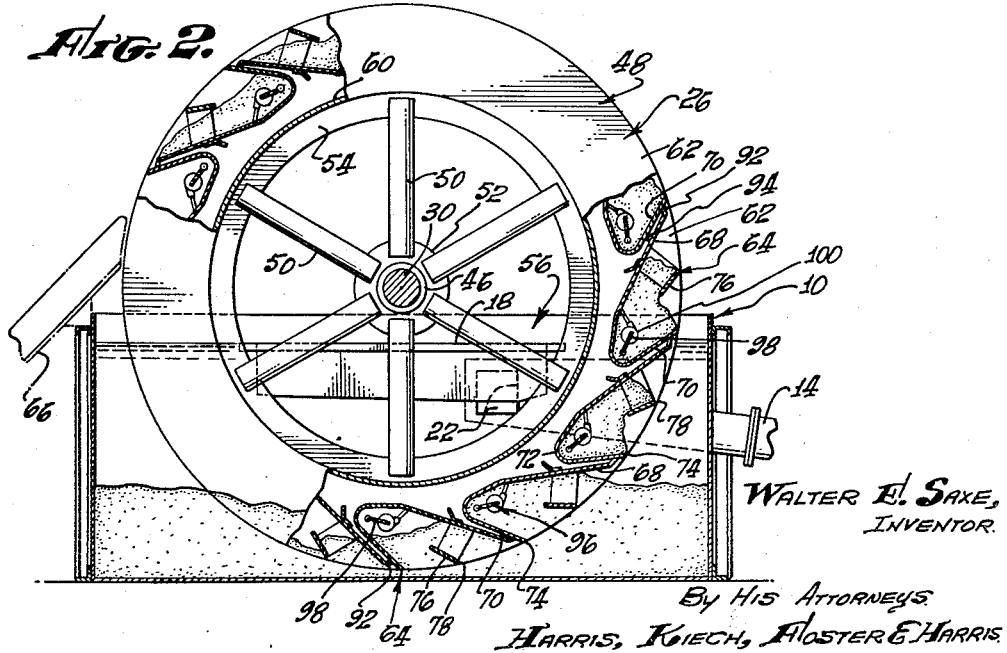

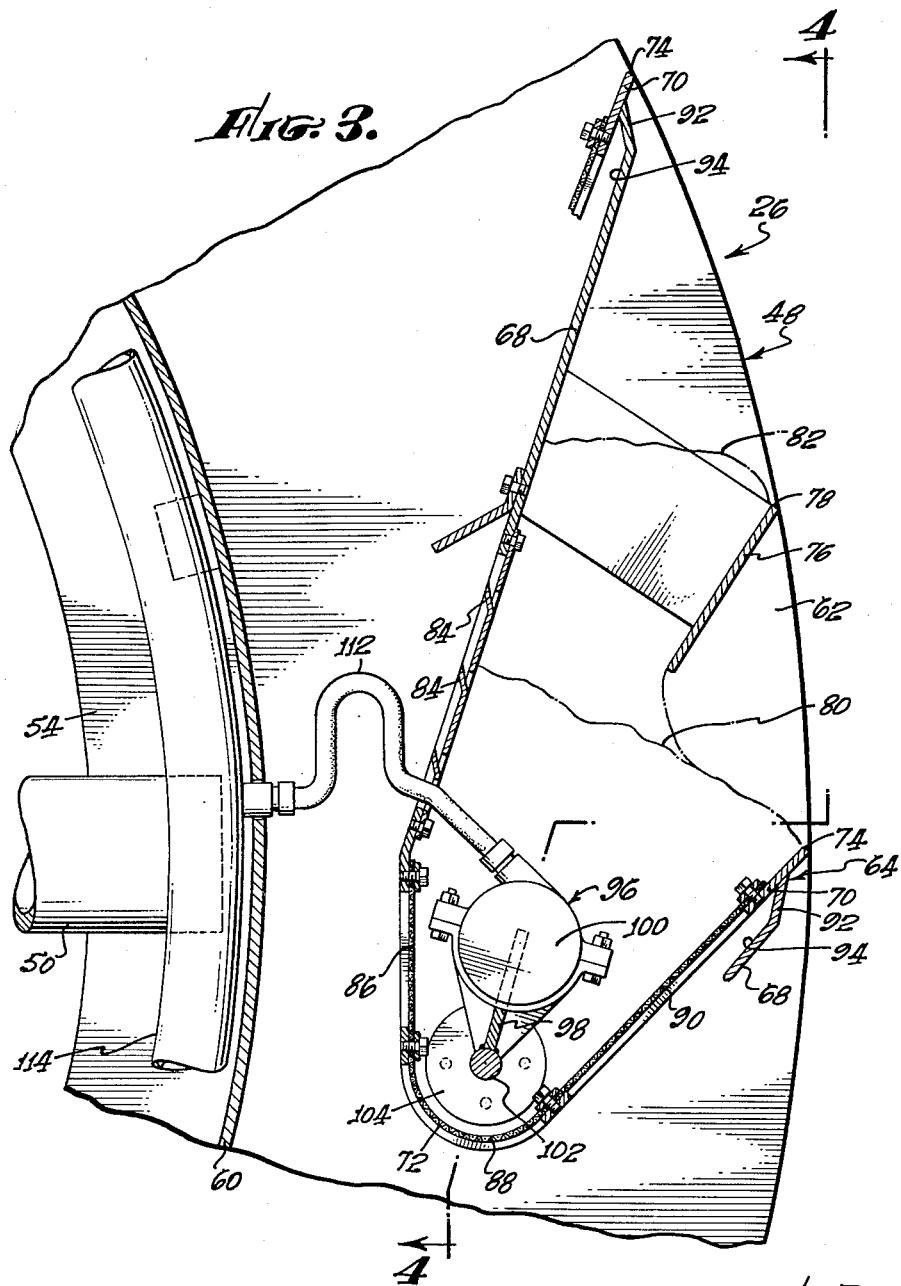

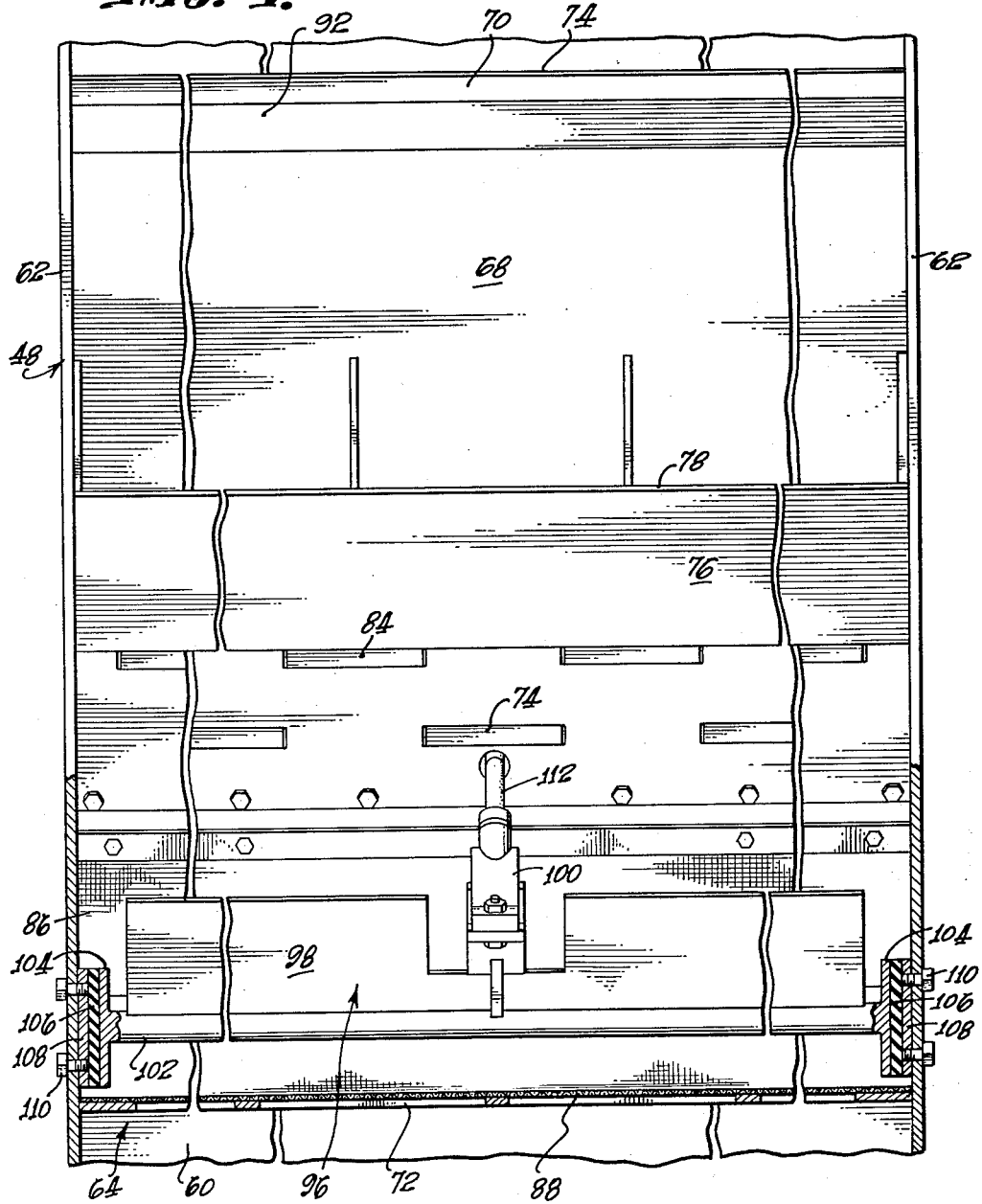

3,044,629
SAND WHEEL
Walter E. Saxe, Pasadena, Calif., assignor to The Conveyor Company, Los Angeles, Calif., a corporation of California
Filed Aug. 4, 1958, Ser. No. 752,903
7 Claims. (Cl. 210—384)

The present invention relates in general to an apparatus for separating solids, and particularly solids in particle form, from liquids with which the solids are intermingled, the apparatus comprising a wheel carrying water pervious buckets which scoop the solid material from the liquid as the buckets move through a tank containing the solid-liquid mixture. Since the invention is of particular utility in separating sand from water, it will be considered in such connection herein as a matter of convenience and will be referred to as a sand wheel for the same reason.

An important object of the invention is to provide a wheel which includes a hub, a rim carrying the buckets or scoops, and spokes interconnecting the hub and the rim. This construction results in a wheel with a more-or-less open interior, as contrasted to the construction disclosed in my Patent No. 2,675,128, granted April 13, 1954, such open wheel construction greatly increasing the water handling capacity of the apparatus, which is an important feature.

Another object of the invention is to provide a wheel having a rim which is channel-shaped in cross section and which includes an inner wall and radially-outwardly-extending side walls, the buckets or scoops being disposed between the side walls of the rim and radially outwardly of the inner wall thereof. With this construction, the channel-shaped rim conveys the water flowing through the scoops back into the tank.

The open wheel construction of the invention has another advantage in that it provides a relatively quiescent water zone in the tank above the submerged portion of the rim and between the side walls thereof in a region adjacent the spokes, which are considerably narrower than the rim in the axial direction. An important object of the invention in this connection is to provide the tank with a weir-like overflow outlet disposed in such relatively quiescent zone, i.e., disposed at least partially between the side walls of the rim, so as to minimize the loss of sand, and particularly the fines therein, through the overflow outlet.

Each scoop includes an inner wall and an outer wall spaced radially outwardly from the inner wall, and it is conventional, as disclosed in my aforementioned patent, to make at least a portion of the inner wall of each scoop water pervious. Another important object of the invention is to make at least a portion of the outer wall of each scoop water pervious also, which facilitates the escape of water from the scoop as it is being loaded with sand while submerged in the tank. Consequently, making the outer walls of the buckets water pervious also results in maximum bucket loading and more uniform bucket loading, which are important features.

A further important object of the invention is to provide each bucket or scoop with an auxiliary outer wall circumferentially ahead of the outer wall previously discussed, hereinafter referred to as the main outer wall, such auxiliary outer wall causing the sand to enter the bucket in two places at the same time and thus further increasing the bucket loading, which is an important feature.

An important advantage of increasing the bucket loading in the foregoing manner is that the wheel may be rotated more slowly than with prior systems, thereby providing a drier product.

Still another important object of the invention is to provide a sand wheel having a vibrator within each bucket or scoop, each vibrator including a vibratable member or impeller and means for vibrating same. The vibrators act on the sand in the scoops to expel a great deal of the excess water from the sand prior to dumping of the sand from the scoops, thereby providing a very dry product, which is an important feature.

The foregoing objects, advantages, features and results of the present invention, together with various other objects, advantages, features and results thereof which will be evident to those skilled in the art to which the invention pertains, may be attained with the exemplary embodiment of the invention described in detail hereinafter and illustrated in the accompanying drawings, in which:

FIG. 1 is a plan view of a dual-sand-wheel apparatus which embodies the invention;

FIG. 2 is a transverse sectional view taken along the arrowed line 2—2 of FIG. 1;

FIG. 3 is an enlarged, fragmentary sectional view taken along the arrowed line 3—3 of FIG. 1; and FIG. 4 is a view, partially in elevation and partially in section, taken as indicated by the irregular arrowed line 4—4 of FIG. 3 of the drawings.

Referring first to FIGS. 1 and 2 of the drawings, the numeral 10 designates a tank into which a mixture of water and sand is introduced through an inlet pipe 12 and from which water is withdrawn through outlet pipes 14 and 16, the latter respectively being connected to weir-like overflow outlets 18 and 20 by conduits 22 and 24.

On opposite sides of the inlet pipe 12 and respectively adjacent the overflow outlets 18 and 20 are wheels 26 and 28 which are mounted on axially aligned, horizontal shafts 30 and 32, respectively, and which extend downwardly into the tank 10. The shafts 30 and 32 are rotatable in bearings 34 and 36, respectively, and are driven by motors 38 and 40, respectively, connected thereto by gear trains 42 and 44, respectively.

The wheels 26 and 28, and the various elements associated therewith, are identical so that only the wheel 26, and the elements associated therewith, will be considered hereinafter.

The wheel 26 includes a hub 46 which is fixed on the shaft 30 in any suitable manner. Encircling and spaced radially outwardly from the hub 46 is a rim 48 which is connected to the hub by radial spokes 50, the latter being connected to the hub and the rim in any suitable manner. For example, the hub 46 and the rim 48 may be provided with external and internal annular flanges 52 and 54, respectively, which extend into notches in the inner and outer ends, respectively, of the spokes 50, the respective ends of the spokes being welded to such flanges.

The foregoing more-or-less open construction of the wheel 26 considerably increases the volume of water which the apparatus is capable of handling, as compared to a wheel of the type disclosed in my aforementioned patent, for example, which is an important feature of the invention.

The rim 48 is considerably wider, in the axial direction, than the spokes 50 to provide within the tank 10 relatively quiescent water zones 56 and 58 between the sides of the rim on opposite sides of the spokes 50 and above the submerged portion of the rim. The corresponding overflow outlet 18 is located at least partially within one of these water zones, e.g., within the water zone 56, and may be located entirely therewithin if desired. With this construction, there is insufficient agitation of the water in the vicinity of the overflow outlet 18 to maintain even sand fines in suspension, whereby loss of sand through the overflow outlet 18 is minimized, which is an important feature.

The rim 48 is channel-shaped in cross section and includes an inner wall 60 and radially-outwardly-extending side walls 62 which form the hereinbefore-mentioned sides of the rim.

Extending between and mounted on the side walls 62 of the rim 48 radially outwardly of the inner wall 60 thereof are circumferentially spaced, water pervious buckets or scoops 64 which face forwardly with respect to the direction of rotation of the wheel 26, i.e., which face in the direction of rotation of such wheel. As clearly shown in FIG. 2, the buckets 64 scoop sand from the bottom of the tank 10 as the wheel rotates and carry such sand upwardly to a position wherein the sand falls from the buckets onto a discharge chute 66. The water which passes through the scoops or buckets 64 as they move upwardly out of the tank 10 is returned to the tank by the channel-shaped rim 48.

Each scoop 64 is generally U-shaped or V-shaped in cross section and includes radially spaced inner and main outer walls 68 and 70 which diverge forwardly, i.e., which diverge in the direction of rotation of the wheel 26, and which are interconnected by a rear or bottom wall 72. For efficient scooping, the main outer wall 70 makes an angle of approximately 45° with a radial plane containing the axis of the wheel 26. The outer or forward edge 74 of each main outer wall, which edge is hereinafter referred to as a main digging edge, thus scoops up sand with maximum effectiveness.

In order to achieve maximum scoop or bucket loading, and to achieve uniform loading, each bucket includes an auxiliary outer wall 76 spaced radially outwardly from the corresponding inner wall 68 and spaced circumferentially forwardly of the corresponding main outer wall 70, each auxiliary outer wall 76 making approximately the same angle with a radial plane containing the axis of the wheel 26 as the corresponding main outer wall 70. The forward or outer edge 78 of each auxiliary outer wall 76, which edge is hereinafter referred to as an auxiliary lies substantially on a circle defined by the main digging edges 74 of the scoops 64. As clearly shown in FIGS. 2 and 3, the provision of both the main and auxiliary digging edges 74 and 78 results in loading of each scoop 64 in two places to obtain maximum bucket loading, which is an important feature. In FIG. 3 of the drawings, the numeral 80 designates the quantity of sand which each bucket 64 would scoop up if the main outer wall 70 were utilized alone, while the numeral 82 designates the extra quantity of sand which is scooped up as the result of the presence of the corresponding auxiliary outer wall 76. The size of the extra quantity 82 of sand scooped up by each auxiliary outer wall 76 varies, of course, with the fluidity of the sand, and may be somewhat more or less than the quantity shown.

As is conventional, the inner and rear walls 68 and 72 of each bucket or scoop 64 are water pervious, this being shown in my aforementioned patent, for example. Such water perviousness of the inner and rear walls 68 and 72 may be attained in various ways. For example, the inner wall 68 of each scoop 64 is shown as provided with a portion provided with louvers 84 therein and a portion comprising a screen 86, the rear wall 72 of each scoop also being shown as comprising a screen 88. In accordance with the present invention, a substantial portion of each main outer wall 70 is also water pervious, as by forming same of a screen 90. In actual practice, the screens 86, 88 and 90 of each bucket 64 are constituted by a single screen. With this construction, water may pass freely through the screen 90 of each bucket 64 as it scoops sand from within the tank 10, which further increases the bucket loading over and above the increased bucket loading resulting from providing each bucket with the auxiliary outer wall 76.

The forward or outer edge 92 of the inner wall 68 of each scoop 64 contacts the main outer wall 70 of the adjacent scoop at a point inwardly of the main digging edge 74 thereof. However, inwardly of this point, the inner wall 68 of each scoop 64 is spaced from the main outer wall 70 of the adjacent scoop to provide a drainage channel 94 for water passing through the screen 90 of such main outer wall.

While the structure thus far described will remove a substantial portion of the water from each bucket or scoop load of sand, an important feature of the invention is to provide within each bucket or scoop 64 a vibrator 96 engageable with the sand in such bucket to expel additional water therefrom as the bucket moves upwardly out of the tank 10. As best shown in FIGS. 3 and 4, each vibrator 96 comprises a vibratable member or impeller 98 and a vibrating means 100 connected thereto.

In the particular construction illustrated, the vibratable impeller 98 extends between the side walls 62 of the wheel rim 48 and is thus parallel to the axis of the wheel 26. The impeller 98 comprises a flat paddle or blade which is mounted on a shaft 102 having flanges 104 at its ends. Bonded to the flanges 104 are elastomeric plates or discs 106 of rubber, or similar material. Bonded to the elastomeric discs 106 are plates 108 which are secured to the respective side walls 62 of the rim 48 in any suitable manner, as by screws 110. Thus, the vibratable impeller 98 is resiliently mounted within each bucket 64 so that vibration of the impeller is transmitted to the sand in the bucket, but not to the wheel 26 to any appreciable extent, the elastomeric discs 106 serving as a vibration damping means insofar as the wheel 26 itself is concerned.

The vibrating means 100 associated with each bucket 64 is connected to the corresponding impeller 98 and may be of any suitable construction. Preferably, each vibrating means 100 comprises a vibratory fluid-operated motor, which may be of the type comprising a race, not shown, in which a ball, not shown, is driven circumferentially by a fluid stream. The vibrating means 100 may be operated by either a gas, such as air, or a liquid, such as water, the latter being preferable. As shown in FIG. 3, each vibrating means 100 may be supplied with gas or liquid through a flexible conduit 112 connected to an annular manifold 114 carried by the wheel 26. Preferably, each vibrating means 100 is energized, in a manner not shown, only throughout a portion of each revolution of the wheel 26, i.e., throughout that portion of each revolution wherein the corresponding bucket 64 is between the top of the tank 10 and the discharge chute 66.

It is thought that the operation of the invention will be clear from the foregoing disclosure so that a separate description of the operation thereof will not be necessary.

Although an exemplary embodiment of the invention has been disclosed herein for purposes of illustration, it will be understood that various changes, modifications and substitutions may be incorporated therein without departing from the spirit of the invention. For example, while the wheel 26 has been illustrated and described as a circular wheel, it will be understood that it may be any structure capable of moving along a closed path. Consequently, the invention is to be regarded as defined only by the claims which follow.

I claim:

1. In combination: a tank having an overflow outlet; a wheel rotatable relative to said tank about a horizontal axis and extending downwardly into said tank so that successive circumferential portions of said wheel dip downwardly into said tank as said wheel rotates, said wheel including a hub, a rim and spokes interconnecting said hub and said rim, said rim being channel shaped in cross section and having an inner wall and radially-outwardly-extending side walls, said overflow outlet being disposed at least partially between said spokes and one of said side walls of said rim; and circumferentially spaced, water pervious scoops carried by said rim between said side walls thereof.

2. In combination: a tank having an overflow outlet; a wheel rotatable relative to said tank about a horizontal axis and extending downwardly into said tank so that successive circumferential portions of said wheel dip downwardly into said tank as said wheel rotates, said wheel including a hub, a rim having sides, and radial spokes interconnecting said hub and said rim, said spokes having radial axes all disposed in a common vertical plane and having dimensions axially of said wheel which are small compared to the distance between said sides of said rim so as to provide a large unobstructed space between said spokes and at least one of said sides of said rim, said overflow outlet being disposed at least partially between said one side of said rim and said spokes; and circumferentially spaced, water pervious scoops carried by said rim.

3. In combination: a tank; a wheel rotatable relative to said tank about a horizontal axis and extending downwardly into said tank so that successive circumferential portions of said wheel dip downwardly into said tank as said wheel rotates; and circumferentially spaced scoops carried by said wheel adjacent the periphery thereof and facing in the direction of rotation of said wheel, said scoops being water pervious and each having an inner wall, a main outer wall spaced radially outwardly from said inner wall thereof and spaced circumferentially rearward of said inner wall thereof in the direction of rotation of said wheel, and a rear wall interconnecting said inner wall and said main outer wall, each of said scoops also having an auxiliary outer wall spaced radially outwardly from said inner wall thereof and spaced circumferentially forward of said main outer wall thereof and circumferentially rearward of said inner wall thereof in the direction of rotation of said wheel, the space between said inner wall and said auxiliary outer wall communicating openly with the space between said auxiliary outer wall and said main outer wall.

4. In combination: a tank; a wheel rotatable relative to said tank about a horizontal axis and extending downwardly into said tank so that successive circumferential portions of said wheel dip downwardly into said tank as said wheel rotates; and circumferentially spaced scoops carried by said wheel adjacent the periphery thereof and facing in the direction of rotation of said wheel, said scoops being water pervious and each having an inner wall, a main outer wall spaced radially outwardly from said inner wall thereof and spaced circumferentially rearward of said inner wall thereof in the direction of rotation of said wheel, and a rear wall interconnecting said inner wall and said main outer wall, each of said scoops also having an auxiliary outer wall spaced radially outwardly from said inner wall thereof and spaced circumferentially forward of said main outer wall thereof and circumferentially rearward of said inner wall thereof in the direction of rotation of said wheel, the space between said inner wall and said auxiliary outer wall communicating openly with the space between said auxiliary outer wall and said main outer wall, said main and auxiliary outer walls respectively having main and auxiliary digging edges which face forwardly in the direction of rotation of said wheel, said main and auxiliary digging edges of said scoops lying on a common circle.

5. In combination: a tank; a wheel rotatable relative to said tank about a horizontal axis and extending downwardly into said tank so that successive circumferential portions of said wheel dip downwardly into said tank as said wheel rotates; circumferentially spaced, water pervious scoops carried by said wheel adjacent the periphery thereof and facing in the direction of rotation of said wheel; and vibrators connected to said scoops, respectively, each of said vibrators including a vibratable member extending in a direction generally parallel to the axis of said wheel, and including means for vibrating said vibratable member generally radially of said wheel.

6. In combination: a tank; a wheel rotatable relative to said tank about a horizontal axis and extending downwardly into said tank so that successive circumferential portions of said wheel dip downwardly into said tank as said wheel rotates; circumferentially spaced, water pervious scoops carried by said wheel adjacent the periphery thereof and facing in the direction of rotation of said wheel; and vibrators connected to said scoops, respectively, each of said vibrators including a vibratable member and means for vibrating same, each of said vibrators including resilient means connecting said vibratable member thereof to that one of said scoops to which such vibrator is connected.

7. In combination: a tank; a wheel rotatable relative to said tank about a horizontal axis and extending downwardly into said tank so that successive circumferential portions of said wheel dip downwardly into said tank as said wheel rotates; circumferentially spaced, water pervious scoops carried by said wheel adjacent the periphery thereof and facing in the direction of rotation of said wheel; and vibrators connected to said scoops, respectively, each of said vibrators including a vibratable member extending in a direction generally parallel to the axis of said wheel, and including means for vibrating said vibratable member generally radially of said wheel, each of said vibrators including resilient means connecting said vibratable member thereof to that one of said scoops to which such vibrator is connected.

References Cited in the file of this patent

UNITED STATES PATENTS

| | | |
|---|---|---|
| 810,066 | Maguin | Jan. 16, 1906 |
| 859,857 | Tracy | July 9, 1907 |
| 1,644,175 | Church | Oct. 4, 1927 |
| 1,946,663 | Behnke | Feb. 13, 1934 |
| 1,983,968 | Clark | Dec. 11, 1934 |
| 2,194,410 | Svenson | Mar. 19, 1940 |
| 2,365,360 | Smith | Dec. 19, 1944 |
| 2,547,462 | Hapman | Apr. 3, 1951 |
| 2,675,128 | Saxe | Apr. 13, 1954 |

UNITED STATES PATENT OFFICE
CERTIFICATE OF CORRECTION

Patent No. 3,044,629                          July 17, 1962

Walter E. Saxe

It is hereby certified that error appears in the above numbered patent requiring correction and that the said Letters Patent should read as corrected below.

Column 3, line 38, after "auxiliary" insert -- digging edge, --.

Signed and sealed this 11th day of December 1962.

(SEAL)
Attest:

ERNEST W. SWIDER
Attesting Officer

DAVID L. LADD
Commissioner of Patents